Figure 1:
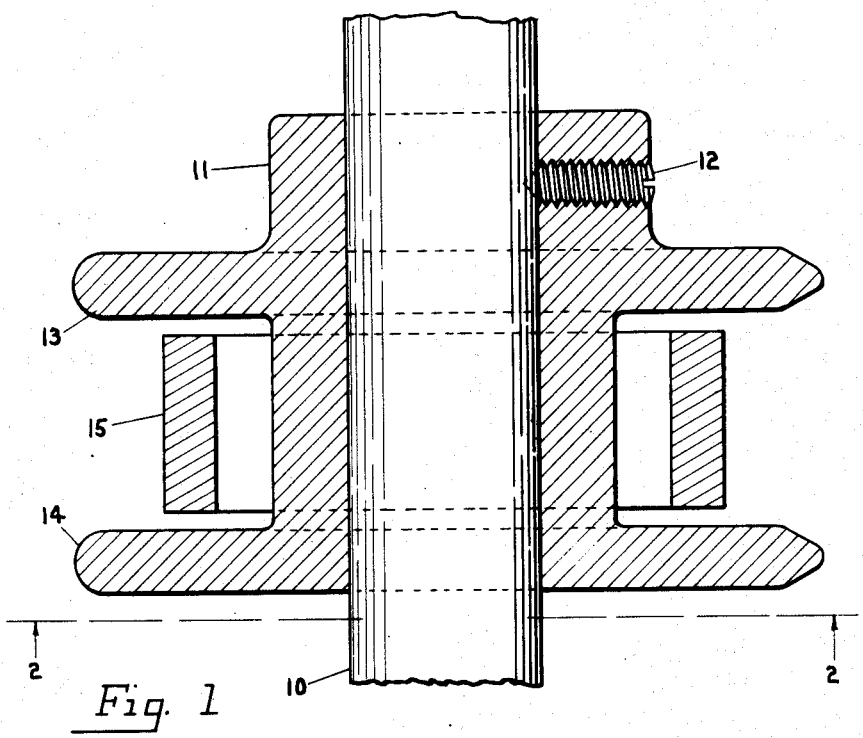

April 18, 1939.     W. S. DIEHL     2,154,442

WIRE VIBRATION DAMPER

Filed Feb. 7, 1938

INVENTOR
WALTER S. DIEHL
BY
ATTORNEY

Patented Apr. 18, 1939

2,154,442

UNITED STATES PATENT OFFICE 2,154,442

WIRE VIBRATION DAMPER

Walter S. Diehl, United States Navy

Application February 7, 1938, Serial No. 189,122

4 Claims. (Cl. 188—103)

(Granted under the act of March 3, 1883, as amended April 30, 1928; 370 O. G. 757)

This invention relates to a wire vibration damper, and has for an object to provide means for damping vibration along wires, particularly on long streamline wires on aircraft, not only for the purpose of possibly reducing the air resistance but also mainly for the purpose of lessening fatigue and crystallization, and hence increasing the safety factor and the life of the wire.

A still further object of this invention is to provide a vibration damper which may be applied to any wire in any location for this purpose.

Figure 2:
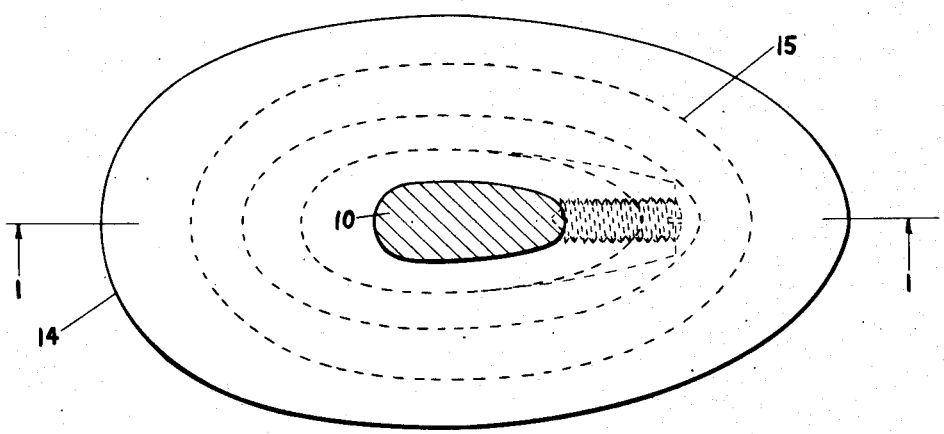

With the foregoing and other objects in view, the invention consists in the construction, combination and arrangement of parts hereinafter described and illustrated in the drawing, in which:

Fig. 1 is a sectional view of the vibration damper as applied to a streamline wire, being on line 1—1 of Fig. 2; and Fig. 2 is a sectional view on line 2—2 of Fig. 1.

There is shown at 10 a streamline wire of the type generally used on aircraft and generally subject to vibration while the aircraft is in flight. A collar 11, internally and externally shaped to conform to the contour of the wire 10, is placed over the streamline wire 10 and held in position thereon as by a set screw 12, the collar 11 being formed of fibre or phenolic condensation product such as Bakelite. This collar 11 is provided with a pair of flanges 13 and 14, between which is floatably located a lead weight 15, the internal and external configuration of the lead weight 15 being similar to that of the collar 11 and wire 10, the size of the lead weight being such that its internal dimensions are substantially greater than the external dimensions of the collar 11, while its external dimensions are somewhat less than that of the external dimensions of the flanges 13 and 14.

In operation, it will be observed that due to the dimensions above described, the major part of the lead weight 15 is spaced somewhat from the collar 11. When the aircraft is in flight any vibration of the wire 10 will be immediately damped by the inertia of the lead weight 15 thereon. The lead weight 15 will naturally not have the same period of vibration as the wire 10, and the spacing between the collar 11 and the lead weight 15 greatly increases the difference in vibration period and thereby even more greatly increases the damping effect of the lead weight 15. If desired, several of these vibration dampers may be placed on a single wire, the entire assembly being small, light, and of low air resistance, the internal opening being so shaped that it may be easily slipped over the end of the wire.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. A wire vibration damper comprising a collar adapted to be secured to the wire whose vibration is to be damped, and a weight encircling said collar, said weight being restrained from axial movement but being unrestrained within the limits of its motion in a plane at right angles to the axis of the wire.

2. A wire vibration damper comprising a collar adapted to be secured to the wire whose vibration is to be damped, said collar being shaped to conform to the contour of the wire, a pair of spaced flanges extending from said collar, and a weight of greater dimensions than said collar and of lesser dimensions than said flanges, whereby said weight is restrained from axial movement along the wire but is unrestrained from movement up to the limit provided in any direction in the plane at right angles to the axis of the wire.

3. A wire vibration damper comprising a lead weight and means for floatably mounting said weight on the wire whose vibration is to be damped, said means comprising a collar and a pair of flanges on said collar between which said weight is mounted, whereby said weight is restrained from axial movement along the wire but is unrestrained from movement up to the limit provided in any direction in the plane at right angles to the axis of the wire.

4. Means for damping the vibration of a streamlined wire comprising a collar adapted to be secured to the wire whose vibration is to be damped, said collar being streamlined to conform to the contour of the wire, a pair of spaced flanges extending from said collar, a weight of greater density than the wire and streamlined to conform to the contour of the wire, said weight being of greater dimensions than said collar and of lesser dimensions than said flanges, said weight encircling said collar, said weight being restrained from axial movement along the wire and from rotary movement around the wire, but being unrestrained within the limits of its motion in a plane at right angles to the axis of the wire.

WALTER S. DIEHL.